(12) United States Patent
Tanaka et al.

(10) Patent No.: US 11,827,165 B2
(45) Date of Patent: Nov. 28, 2023

(54) WIRE HARNESS

(71) Applicant: SUMITOMO WIRING SYSTEMS, LTD., Yokkaichi (JP)

(72) Inventors: Kosuke Tanaka, Yokkaichi (JP); Katsutoshi Izawa, Yokkaichi (JP); Ryuta Saito, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/989,369

(22) Filed: Nov. 17, 2022

(65) Prior Publication Data

US 2023/0166669 A1  Jun. 1, 2023

(30) Foreign Application Priority Data

Nov. 26, 2021  (JP) .................. 2021-192262

(51) Int. Cl.
*B60R 16/02* (2006.01)
*H02G 3/04* (2006.01)

(52) U.S. Cl.
CPC ....... *B60R 16/0215* (2013.01); *H02G 3/0468* (2013.01)

(58) Field of Classification Search
CPC .......................... H01B 7/0045; B60R 16/0215
USPC ............... 174/72 A; 248/68.1, 73, 74.1–74.4
See application file for complete search history.

(56) References Cited

U.S. PATENT DOCUMENTS

| | | | |
|---|---|---|---|
| 6,595,473 B2 * | 7/2003 | Aoki | B60R 16/0215 138/108 |
| 2017/0030487 A1 * | 2/2017 | Sampson | F16L 55/035 |
| 2019/0089142 A1 | 3/2019 | Sugino | |
| 2020/0274343 A1 | 8/2020 | Sugino | |
| 2020/0350097 A1 * | 11/2020 | Sugino | H01B 7/20 |

FOREIGN PATENT DOCUMENTS

| | | | | |
|---|---|---|---|---|
| JP | 2019-053894 A | | 4/2019 | |
| WO | WO-2014141935 A1 * | | 9/2014 | B60R 16/0215 |

* cited by examiner

*Primary Examiner* — Paresh Paghadal
(74) *Attorney, Agent, or Firm* — Oliff PLC (57) ABSTRACT

A wire harness including a wire harness body including an electric wire, an exterior tube that covers an outer circumferential surface of the electric wire, and a first path regulator configured to be attached to an outer circumferential surface of the exterior tube and regulate a path of the exterior tube; and an attachment configured to be attached to an outer circumferential surface of the first path regulator in a lengthwise portion of the first path regulator.

9 Claims, 6 Drawing Sheets

WIRE HARNESS

BACKGROUND

The present disclosure relates to a wire harness.

Conventionally, there is a wire harness for a vehicle that includes an electric wire member, an exterior member that covers the electric wire member, and a path regulating member that is attached to the outer circumferential surface of the exterior member and regulates the path of the exterior member (e.g., see JP 2019-53894A).

SUMMARY

In the above-described wire harness, the path regulating member is sometimes attached to an attachment member such as another path regulating member, and in such a case, it is desirable that rattling does not occur at the portion where the path regulating member and the attachment member are attached. Note that rattling at the attachment portion may cause damage to the attachment portion due to vibration or the like.

An exemplary aspect of the disclosure provides a wire harness capable of suppressing rattling.

A wire harness according to an aspect of the present disclosure includes: a wire harness body including an electric wire, an exterior tube that covers an outer circumferential surface of the electric wire, and a first path regulator configured to be attached to an outer circumferential surface of the exterior tube and regulate a path of the exterior tube; and an attachment configured to be attached to an outer circumferential surface of the first path regulator in a lengthwise portion of the first path regulator, wherein: the first path regulator has an insertion opening that is open in a direction orthogonal to a length direction of the first path regulator, and that extends over an entire length of the first path regulator, the attachment includes a cover configured to cover the outer circumferential surface of the first path regulator, the cover has a through hole that extends through the cover from an outer circumferential side to an inner circumferential side, and the wire harness further comprises a filler introduced through the through hole to a space between the wire harness body and the cover.

The wire harness of the present disclosure exhibits an effect of suppressing rattling.

DETAILED DESCRIPTION OF EMBODIMENTS

Description of Embodiments of Present Disclosure

First, aspects of the present disclosure will be listed and described.

A wire harness according to an aspect of the present disclosure

[1] includes: a wire harness body including an electric wire member, an exterior member that covers an outer circumferential surface of the electric wire member, and a first path regulating member configured to be attached to an outer circumferential surface of the exterior member and regulate a path of the exterior member; and an attachment member configured to be attached to an outer circumferential surface of the first path regulating member in a lengthwise portion of the first path regulating member, wherein the first path regulating member has an insertion opening that is open in a direction orthogonal to a length direction of the first path regulating member, and that extends over an entire length of the first path regulating member, the attachment member includes a cover portion configured to cover the outer circumferential surface of the first path regulating member, the cover portion has a through hole that extends through the cover portion from an outer circumferential side to an inner circumferential side, and the wire harness further includes a filler introduced through the through hole to a space between the wire harness body and the cover portion.

According to this configuration, the portion of the wire harness body that passes through the cover portion is pressed against the cover portion by the filler introduced into the space between the cover portion and the wire harness body. This makes it possible to suppress rattling between the cover portion and the wire harness body.

[2] It is preferable that the filler is provided in the insertion opening, and the filler is interposed between the outer circumferential surface of the exterior member and an inner circumferential surface of the cover portion.

According to this configuration, the exterior member and the first path regulating member can be pressed against the cover portion by the filler introduced into the space between the exterior member and the cover portion. Also, due to the filler being provided in the insertion opening of the first path regulating member, rotation of the first path regulating member in the circumferential direction can be suppressed by the filler. Moreover, due to the filler being formed in the insertion opening of the first path regulating member, the cover portion can have a smaller size in the diameter direction than in the case of a configuration in which the filler is provided so as to be in contact with the outer circumferential surface of the first path regulating member.

[3] It is preferable that the through hole faces the insertion opening in a diameter direction of the cover portion.

According to this configuration, the filler can be favorably introduced into the insertion opening.

[4] It is preferable that the through hole faces the outer circumferential surface of the first path regulating member, and the filler is interposed between the outer circumferential surface of the first path regulating member and an inner circumferential surface of the cover portion. According to this configuration, the first path regulating member can be pressed against the cover portion by the filler introduced into the space between the first path regulating member and the cover portion.

[5] It is preferable that a portion of the filler is provided inside the through hole.

According to this configuration, the through hole can be closed by the filler.

[6] It is preferable that the attachment member includes: a body portion configured to regulate the path of the exterior member, a receiving portion provided at an end portion of the body portion in a length direction of the wire harness body, and a lid portion configured to cover, together with the receiving portion, an entire circumferential range of the first path regulating member, and the receiving portion and the lid portion constitute the cover portion. According to this configuration, it is possible to configure the cover portion that, with use of the receiving portion and the lid portion, covers the outer circumferential surface of the first path regulating member.

[7] It is preferable that the through hole is provided in the lid portion.

According to this configuration, the filler can be introduced through the through hole provided in the lid portion.

[8] It is preferable that the filler is made of a resin material. According to this configuration, the wire harness body can be favorably pressed against the cover portion by the filler made of a resin material.

[9] It is preferable that the attachment member is a second path regulating member that is configured to be attached to the outer circumferential surface of the exterior member and regulate the path of the exterior member, and the cover portion is provided at a lengthwise end portion of the second path regulating member, and covers an outer circumferential surface of a lengthwise end portion of the first path regulating member.

According to this configuration, the cover portion is provided at a lengthwise end portion of the second path regulating member, and covers the outer circumferential surface of a lengthwise end portion of the first path regulating member. For this reason, the first path regulating member and the second path regulating member are coupled in the length direction. Accordingly, the path of the exterior member is regulated with continuity by the first path regulating member and the second path regulating member.

[10] It is preferable that the first path regulating member regulates a path of a straight portion of the wire harness body that extends in a straight line along the path of the wire harness body, and the second path regulating member regulates a path of a bent portion of the wire harness body that bends along the path of the wire harness body.

According to this configuration, the path of the straight portion is regulated by the first path regulating member, and the path of the bent portion is regulated by the second path regulating member. As a result, deviation of the path of the straight portion and the path of the bent portion of the wire harness from the respective desired paths is suppressed with continuity.

Detailed Description of Embodiments of Present Disclosure

Specific examples of a wire harness of the present disclosure will be described below with reference to the drawings. In the drawings, portions of configurations may be exaggerated or simplified for convenience in the description. Also, the dimensional ratios of portions may differ among the drawings. Moreover, the term "orthogonal" in the present specification includes not only cases of being strictly orthogonal, but also cases of being approximately orthogonal to the extent that actions and effects of the present embodiment are achieved.

Also, the term "facing" in this specification refers to the case where surfaces or members are at positions in front of each other, and includes not only the case where the surfaces or members are at positions completely in front of each other, but also the case where the surfaces or members are at positions partially in front of each other. Also, the term "facing" in this specification includes both the case where a member different from two portions is interposed between the two portions, and the case where nothing is interposed between the two portions.

Also, the term "annular" used in the description of this specification may refer to any structure that forms a loop, a continuous shape without ends, as well as a structure that is generally loop-shaped with a gap, such as a C-like shape. Note that "annular" shapes include, but are not limited to, circles, ovals, and polygons with pointed or rounded corners.

Overall Configuration of Wire Harness 10

Figure 1:
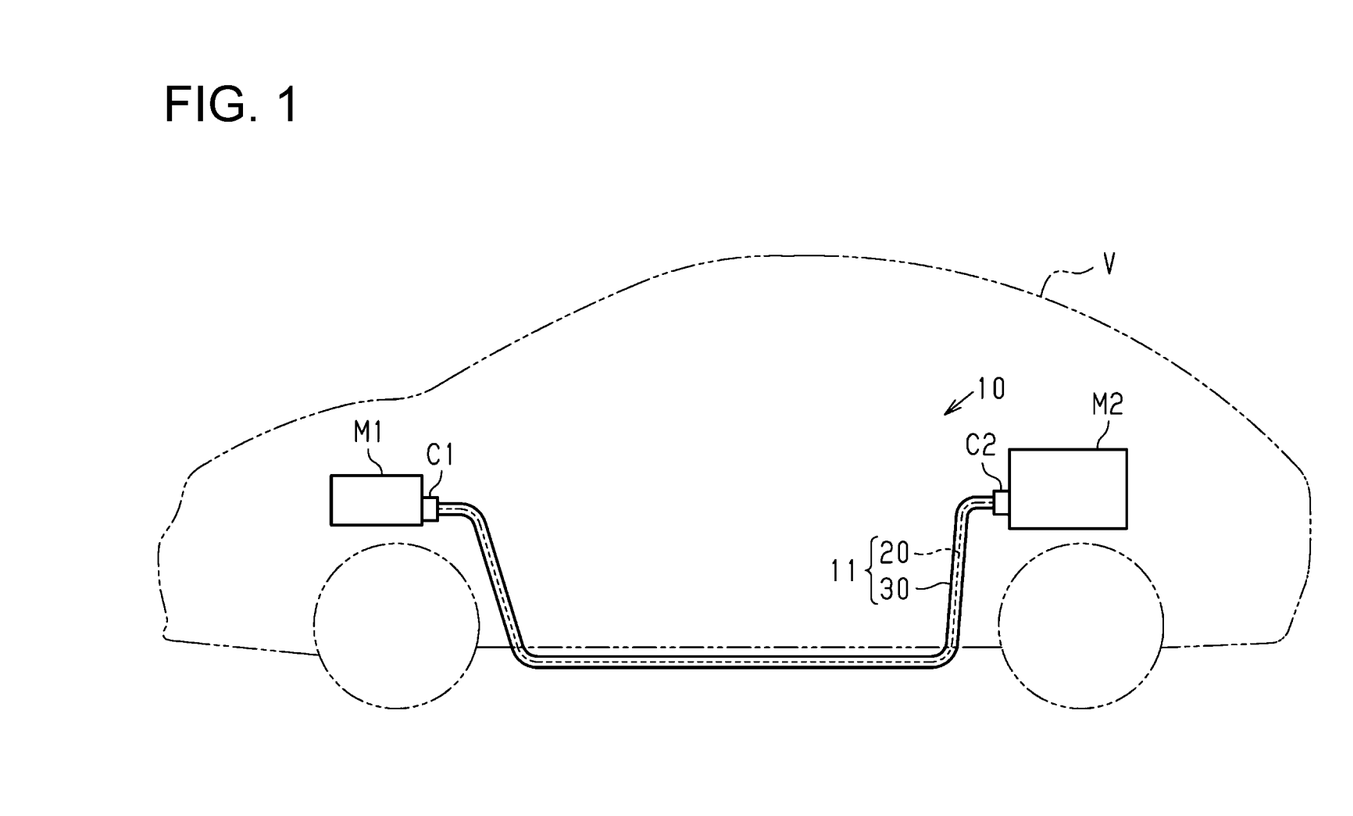
FIG. 1 is a schematic configuration diagram showing a wire harness according to an embodiment.

A wire harness 10 shown in FIG. 1 is to be mounted in a vehicle V such as a hybrid vehicle or an electric vehicle. The wire harness 10 electrically connects two or more in-vehicle devices to each other. The in-vehicle devices are electric devices mounted in the vehicle V. The wire harness 10 electrically connects an inverter M1 that is installed in a front portion of the vehicle V to a high-voltage battery M2 that is installed rearward of the inverter M1 in the vehicle V, for example. The wire harness 10 is elongated so as to extend in the front-rear direction of the vehicle V, for example. The wire harness 10 is routed in the vehicle V such that a lengthwise intermediate portion of the wire harness 10 passes through a region outside the vehicle interior, such as under the floor of the vehicle V.

The inverter M1 is connected to a wheel drive motor (not shown) that serves as a power source for vehicle traveling, for example. The inverter M1 generates AC power from the DC power of the high-voltage battery M2, and supplies the AC power to the motor. The high-voltage battery M2 is a battery that is capable of supplying a voltage of several hundred volts, for example.

The wire harness 10 includes a wire harness body 11. The wire harness body 11 includes an electric wire member 20 (electric wire) and a tubular exterior member 30 (exterior tube) that surrounds the electric wire member 20. The wire harness body 11 also includes a first path regulating member 40 (first path regulator) that is attached to the outer circumferential surface of the exterior member 30 and regulates the path of the exterior member 30 (see FIG. 2). The wire harness 10 includes connectors C1 and C2 that are respectively attached to two end portions of the electric wire member 20. One lengthwise end portion of the electric wire member 20 is connected to the inverter M1 via the connector C1, and the other lengthwise end portion of the electric wire member 20 is connected to the high-voltage battery M2 via the connector C2.

Figure 2:
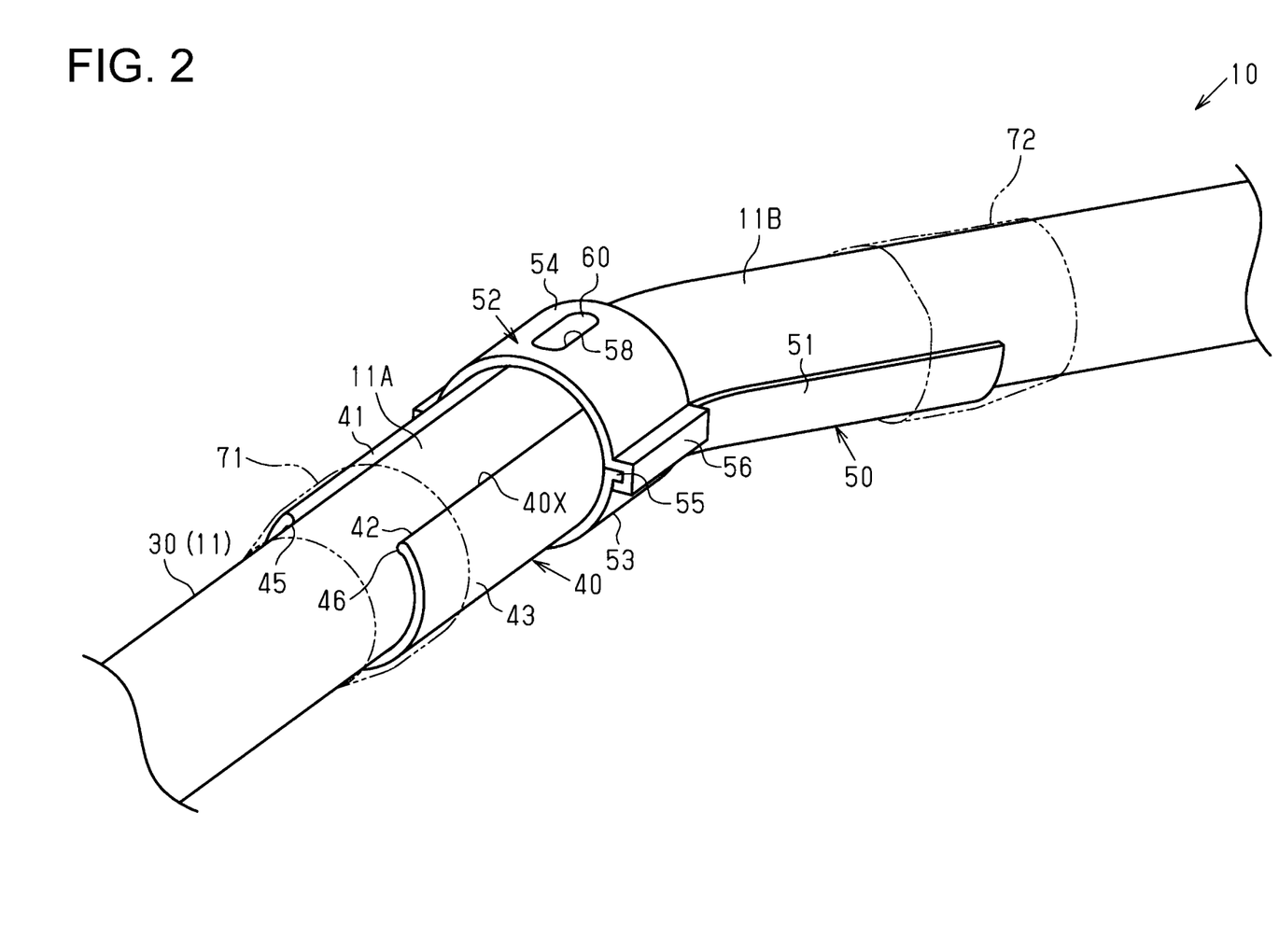
FIG. 2 is a schematic perspective view showing the wire harness according to the embodiment.

As shown in FIG. 2, the wire harness 10 includes a second path regulating member 50 (second path regulator) that is attached to the outer circumferential surface of the exterior member 30. The first path regulating member 40 and the second path regulating member 50 regulate the path along which the wire harness body 11 is routed. Note that the first path regulating member 40 and the second path regulating member 50 are omitted from FIG. 1.

Configuration of Electric Wire Member 20

Figure 3:
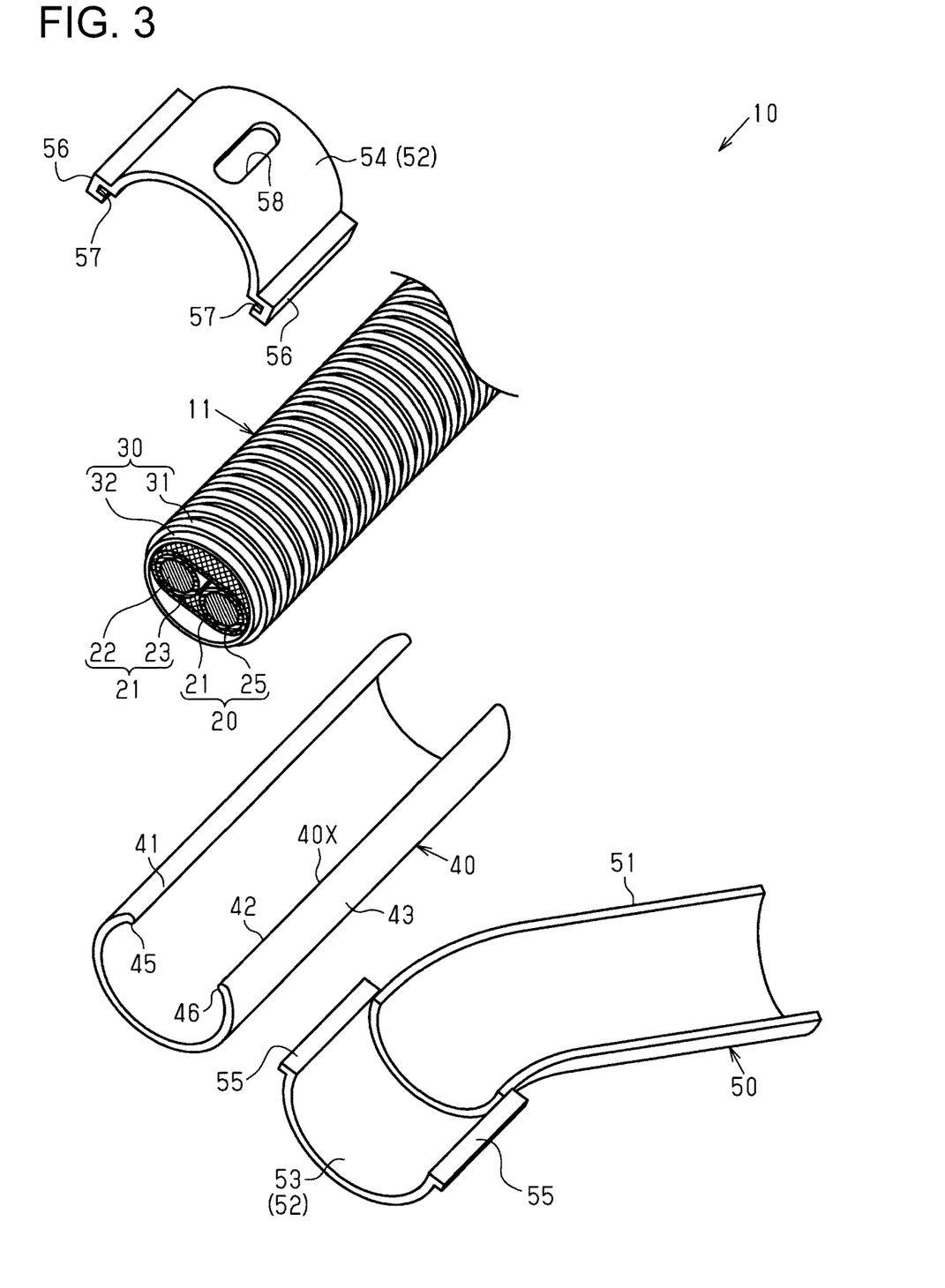
FIG. 3 is a schematic exploded perspective view showing the wire harness according to the embodiment.
Figure 4:
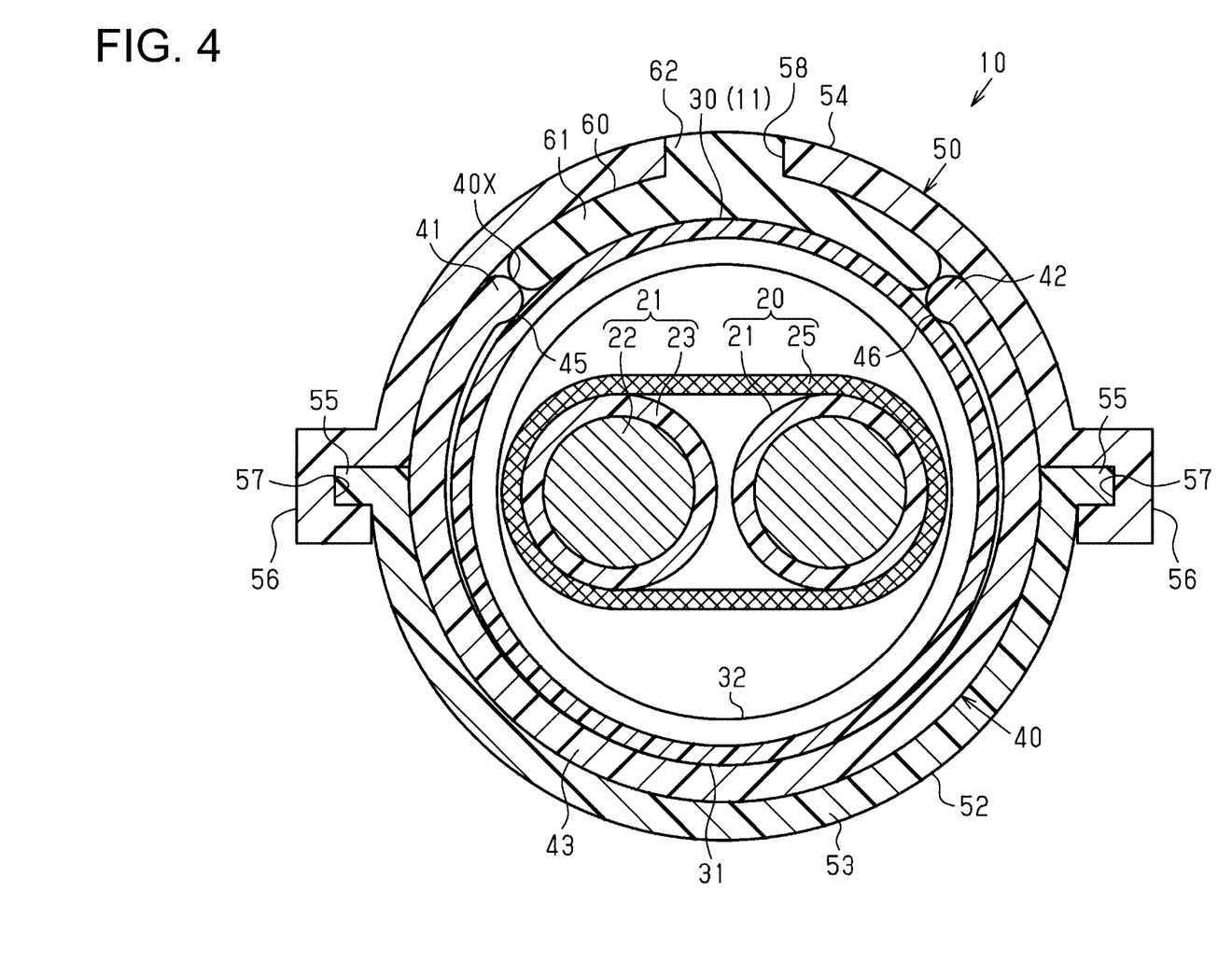
FIG. 4 is a schematic transverse cross-sectional view showing the wire harness according to the embodiment.

As shown in FIGS. 3 and 4, the electric wire member 20 includes one or more electric wires 21 (two in the present embodiment) and a braided member 25 that surrounds all of the electric wires 21, for example.

Each of the electric wires 21 is a coated electric wire that includes a conductive core wire 22 and an insulating covering 23 that surrounds the core wire 22 and has insulating properties. Each electric wire 21 is a high-voltage electric wire that can conduct a high voltage and a large current, for example. Each electric wire 21 may be a non-shielded electric wire that does not have an electromagnetic shield structure, or a shielded electric wire that has an electromagnetic shield structure, for example. Each electric wire 21 in the present embodiment is a non-shielded electric wire.

The core wire 22 can be a stranded wire that is constituted by a plurality of metal strands twisted together, a single core wire that is constituted by a single conductor, or the like. The single core wire can be a columnar conductor that is constituted by one columnar metal rod with a solid internal structure, a tubular conductor with a hollow internal structure, or the like. The core wire 22 may be any combination of a stranded wire, a columnar conductor, and a tubular conductor. The core wire 22 can be made of a metal material such as a copper-based material or an aluminum-based material, for example.

The insulating covering 23 covers an entire circumferential range of the outer circumferential surface of the core wire 22, for example. The insulating covering 23 is constituted by a resin material that has insulating properties, for example.

The cross-sectional shape of each electric wire 21 cut along a plane orthogonal to the length direction of the electric wire 21, that is to say the transverse cross-sectional shape of each electric wire 21, can be any shape. The transverse cross-sectional shape of each electric wire 21 may be a circular shape, a semicircular shape, a polygonal shape, a square shape, or a flattened shape, for example. The transverse cross-sectional shape of each electric wire 21 in the present embodiment is a circular shape.

The braided member 25 has a tubular shape that surrounds the outer circumferential surfaces of all of the electric wires 21, for example. The braided member 25 can be a braided wire in which a plurality of metal strands are braided together, or a braided wire in which a combination of metal strands and resin strands are braided together, for example. The metal strands can be formed using a metal material such as a copper-based material or an aluminum-based material, for example. Although not shown in the drawings, the two lengthwise end portions of the braided member 25 are grounded at the connectors C1 and C2 (see FIG. 1), for example.

Configuration of Exterior Member 30

The exterior member 30 has a tubular shape surrounding the entire circumferential range of the outer circumferential surface of the electric wire member 20. The exterior member 30 in the present embodiment has a cylindrical shape. The exterior member 30 is provided with a circumferential wall that is formed so as to be continuous over the entire circumferential range of the outer circumferential surface of the exterior member 30, for example. The exterior member 30 is sealed over the entire circumferential range of the outer circumferential surface of the exterior member 30, for example. The exterior member 30 has a function of protecting the electric wire member 20 from flying objects and water droplets, for example.

The exterior member 30 has flexibility and is easily bendable, for example. The flexible exterior member 30 can be a resin corrugated tube or a rubber waterproof cover, for example. The exterior member 30 of the present embodiment is a corrugated tube made of resin having a bellows shape whose diameter repeatedly increases and decreases in the length direction of the exterior member 30. In other words, the exterior member 30 of the present embodiment has a bellows structure in which large-diameter portions 31 and small-diameter portions 32, which are smaller in diameter than the large-diameter portions 31, are alternatingly connected along the length direction of the exterior member 30. The large-diameter portions 31 and the small-diameter portions 32 each have an annular shape that extends one time around the circumference of the exterior member 30, for example. The exterior member 30 can be made of a synthetic resin such as polyolefin, polyamide, polyester, or ABS resin, for example. Note that in FIG. 2, the exterior member 30 is illustrated in a simplified manner for the sake of simplification of the drawing.

Configuration of First Path Regulating Member 40 and Second Path Regulating Member 50

As shown in FIGS. 2 and 3, the first path regulating member 40 and the second path regulating member 50 each hold the exterior member 30. The first path regulating member 40 and the second path regulating member 50 are each harder than the exterior member 30, for example. The first path regulating member 40 and the second path regulating member 50 each have a hardness according to which, compared with the exterior member 30, they less easily bend in a direction orthogonal to the length direction of the wire harness body 11. As a result, the first path regulating member 40 and the second path regulating member 50 each regulate the path of the wire harness body 11. For example, the first path regulating member 40 and the second path regulating member 50 each assist the exterior member 30 such that the wire harness body 11 does not deviate from the desired path by bending due to its own weight or the like.

As shown in FIG. 2, the first path regulating member 40 is provided along a portion of the wire harness body 11 with respect to the length direction. For example, the first path regulating member 40 is attached to the outer circumferential surface of the exterior member 30 along a straight portion 11A, which is a portion extending in a straight line along the path of the wire harness body 11. The first path regulating member 40 regulates the path of the wire harness body 11 in the straight portion 11A. Here, the straight portion 11A is a portion in which the path of the wire harness body 11 extends straight in one direction. Note that one or more first path regulating members 40 are provided depending on the path of the wire harness body 11.

The second path regulating member 50 is provided along a portion of the wire harness body 11 with respect to the length direction. For example, the second path regulating member 50 is attached to the outer circumferential surface of the exterior member 30 along a bent portion 11B, which is a portion that bends along the path of the wire harness body 11. The second path regulating member 50 regulates the path of the wire harness body 11 in the bent portion 11B. Here, the bent portion 11B is a portion that bends such that the path of the wire harness body 11 deviates from a straight line. Note that one or more second path regulating members 50 may be provided depending on the path of the wire harness body 11.

Configuration of First Path Regulating Member 40

As shown in FIGS. 2 and 4, the first path regulating member 40 covers part of the outer circumferential surface of the exterior member 30 in the circumferential direction of the exterior member 30. The first path regulating member 40 has a shape that covers the outer circumferential surface of the exterior member 30 in a portion of the exterior member 30 in the circumferential direction. The transverse cross-sectional shape of the first path regulating member 40 is C-shaped overall. The first path regulating member 40 covers a range larger than half of the outer circumferential surface of the exterior member 30, for example. Specifically, the first path regulating member 40 covers a range of the outer circumferential surface of the exterior member 30 that is larger than half of the entire circumference of the exterior member 30 in the circumferential direction.

As shown in FIG. 2, the first path regulating member 40 extends along the length direction of the exterior member 30 in the straight portion 11A. The first path regulating member 40 is formed with a shape extending in a straight line in one direction, for example. The transverse cross-sectional shape of the first path regulating member 40 is uniform over the entire length of the first path regulating member 40 in the length direction, for example.

The first path regulating member 40 is made of a metal or a resin, for example. The first path regulating member 40 of the present embodiment is made of a resin. A synthetic resin such as polypropylene, polyamide, or polyacetal can be used as the material of the first path regulating member 40, for example. The first path regulating member 40 can be manufactured through a known manufacturing method such as extrusion molding or injection molding. In the present embodiment, the first path regulating member 40 is an extrusion molded article manufactured by extrusion molding. For this reason, the first path regulating member 40 can be easily manufactured by using an extrusion molder that extrudes the raw material of the first path regulating member 40 in the length direction. Also, a single extrusion molder can be used to manufacture a plurality of types of first path regulating members 40 that have different dimensions in the length direction. For example, by cutting the base material of the first path regulating member 40 formed by a single extrusion molder to an appropriate length using a cutting machine, a plurality of types of first path regulating members 40 having different dimensions in the length direction can be manufactured.

As shown in FIGS. 3 and 4, the first path regulating member 40 has an insertion opening 40X that is open in a direction orthogonal to the length direction of the first path regulating member 40. The insertion opening 40X extends over the entirety of the first path regulating member 40 in the length direction. The first path regulating member 40 includes a first end portion 41 and a second end portion 42 that are the two end portions of the first path regulating member 40 in the circumferential direction and form the insertion opening 40X. The first path regulating member 40 includes a connecting portion 43 that connects the first end portion 41 and the second end portion 42. In other words, the first path regulating member 40 includes the connecting portion 43 formed so as to cover a portion of the exterior member 30 in the circumferential direction, the first end portion 41 and the second end portion 41 provided at the two end portions of the connecting portion 43, and the insertion opening 40X formed by the first end portion 41 and the second end portion 42.

The connecting portion 43 constitutes a main portion of the first path regulating member 40. The thickness of the connecting portion 43 in the diameter direction is uniform along the circumferential direction of the first path regulating member 40, for example. The transverse cross-sectional shape of the connecting portion 43 is a shape that extends along the outer surface of the exterior member 30, for example. The transverse cross-sectional shape of the first end portion 41, the second end portion 42, and the connecting portion 43 is an arc shape, for example.

The first end portion 41 and the second end portion 42 are provided on opposite sides of the first path regulating member 40 in the circumferential direction. The first end portion 41 and the second end portion 42 are separated from each other in the circumferential direction of the first path regulating member 40 with the insertion opening 40X interposed therebetween. In other words, the gap between the first end portion 41 and the second end portion 42 in the circumferential direction of the first path regulating member 40 is configured as the insertion opening 40X. In this way, the first path regulating member 40 is C-shaped and has the insertion opening 40X in a portion of the first path regulating member 40 in the circumferential direction.

The transverse cross-sectional shape of the leading ends of the first end portion 41 and the second end portion 42 is a curved shape. The transverse cross-sectional shape of the leading ends of the first end portion 41 and the second end portion 42 of the present embodiment is an arc shape.

The first path regulating member 40 includes a protruding portion 45 that protrudes from the inner surface of the first end portion 41 and a protruding portion 46 that protrudes from the inner surface of the second end portion 42. The protruding portions 45 and 46 protrude toward the exterior member 30 that has been inserted into the first path regulating member 40, and come into contact with the outer surface of the exterior member 30. The protruding portions 45 and 46 come into contact with the outer surfaces of the large-diameter portions 31 of the exterior member 30. The protruding portion 45 protrudes from the inner surface of the leading end of the first end portion 41, for example. The protruding portion 46 protrudes from the inner surface of the leading end of the second end portion 42, for example. The transverse cross-sectional shape of the protruding portions 45 and 46 is a curved shape, for example. The transverse cross-sectional shape of the protruding portions 45 and 46 of the present embodiment is an arc shape. The protruding portions 45 and 46 extend in the length direction of the first path regulating member 40. The protruding portions 45 and 46 extend over the entirety of the first path regulating member 40 in the length direction, for example.

The protruding portions 45 and 46 press the exterior member 30 from outside of the exterior member 30. The exterior member 30 is elastically sandwiched between the protruding portion 45, the protruding portion 46, and the connecting portion 43. Accordingly, the coupling of the first path regulating member 40 to the exterior member 30 is strengthened.

As shown in FIG. 4, the opening width of the insertion opening 40X, that is to say the shortest distance between the first end portion 41 and the second end portion 42, is smaller than the outer diameter of the exterior member 30.

The opening width of the insertion opening 40X increases as the first path regulating member 40 elastically deforms. For example, the opening width of the insertion opening 40X increases due to insertion of the exterior member 30 into the insertion opening 40X in a direction orthogonal to the length direction of the first path regulating member 40. When the exterior member 30 is inserted into the first path regulating member 40, the first path regulating member 40 undergoes elastic restoration to return to the original shape. Accordingly, the first path regulating member 40 is attached to the outer circumferential surface of the exterior member 30 due to the opening width of the insertion opening 40X being smaller than the outer diameter of the exterior member 30.

Configuration of Second Path Regulating Member 50

As shown in FIG. 2, the second path regulating member 50 is attached to the outer circumferential surface of the exterior member 30 in the bent portion 11B. The second path regulating member 50 extends along the length direction of the exterior member 30 in the bent portion 11B. The second path regulating member 50 is bent along the shape of the bent portion 11B, for example.

The second path regulating member 50 is made of a metal or a resin, for example. The second path regulating member 50 of the present embodiment is made of a resin. A synthetic resin such as polypropylene, polyamide, or polyacetal can be used as the material of the second path regulating member 50, for example. The second path regulating member 50 can be manufactured by a well-known manufacturing method such as injection molding.

As shown in FIGS. 2, 3, and 4, the second path regulating member 50 includes a body portion 51 (body) and a cover portion 52 (cover) that covers a lengthwise end portion of the first path regulating member 40.

The body portion 51 is formed in an elongated shape extending along the length direction of the exterior member 30 in the bent portion 11B, for example. The body portion 51 extends along the path of the bent portion 11B, for example. In other words, the body portion 51 has a bent shape that bends along the shape of the bent portion 11B. The body portion 51 covers a portion of the outer circumferential surface of the exterior member 30 in the circumferential direction of the exterior member 30. The body portion 51 covers a range of approximately half of the exterior member 30 in the circumferential direction, for example. For example, the body portion 51 covers a range of approximately 180° of the exterior member 30 in the circumferential direction. The body portion 51 has a substantially semi-cylindrical shape, for example.

The cover portion 52 is provided at one lengthwise end portion of the body portion 51. The cover portion 52 includes a receiving portion 53 (receiver) that is integrated with the one lengthwise end portion of the body portion 51, and a lid portion 54 (lid) that covers the receiving portion 53.

The receiving portion 53 covers a portion of the outer circumferential surface of the first path regulating member 40 in the circumferential direction of the first path regulating member 40. The receiving portion 53 covers a portion of one lengthwise end portion of the first path regulating member 40 in the circumferential direction. The receiving portion 53 has a shape that partially covers the outer circumferential surface of the first path regulating member 40 in the circumferential direction of the first path regulating member 40. The transverse cross-sectional shape of the receiving portion 53 is a semi-cylindrical shape as a whole. The receiving portion 53 has a semi-cylindrical shape with a diameter larger than that of the body portion 51, for example. The receiving portion 53 covers half of the first path regulating member 40 in the circumferential direction, for example.

The lid portion 54 and the receiving portion 53 together cover the entire circumferential range of the end portion of the first path regulating member 40. Specifically, the lid portion 54 and the receiving portion 53 together cover the entirety of the outer circumferential surface of the end portion of the first path regulating member 40 in the circumferential direction. The lid portion 54 of the present embodiment covers a portion of the outer circumferential surface of the first path regulating member 40 and a portion of the outer circumferential surface of the exterior member 30 exposed from the insertion opening 40X.

The transverse cross-sectional shape of the lid portion 54 is a semi-cylindrical shape as a whole. The lid portion 54 has a semi-cylindrical shape with the same diameter as the receiving portion 53. The lid portion 54 covers a range of half of the outer circumferential surface of the first path regulating member 40 in the circumferential direction, which is a range of the outer circumferential surface of the first path regulating member 40 along the circumferential direction not covered by the receiving portion 53.

The lid portion 54 is a member that is separate from the receiving portion 53, for example.

The receiving portion 53 includes first coupling portions 55. The first coupling portions 55 are respectively provided at the two end portions of the receiving portion 53 in the circumferential direction. The first coupling portions 55 protrude outward in the diameter direction from the two end portions of the receiving portion 53 in the circumferential direction.

The lid portion 54 includes second coupling portions 56. The second coupling portions 56 are respectively provided at the two end portions of the lid portion 54 in the circumferential direction. The second coupling portions 56 each include a groove 57 for insertion of the corresponding first coupling portion 55. The grooves 57 extend along the length direction of the second path regulating member 50. The second coupling portions 56 can be attached to the first coupling portions 55 by sliding along the length direction of the second path regulating member 50. By coupling the first coupling portions 55 and the second coupling portions 56 to each other, the receiving portion 53 and the lid portion 54 are held so as not to separate from each other.

Composition of Filler 60

As shown in FIG. 4, the wire harness 10 includes a filler 60 provided between the cover portion 52 and the wire harness body 11. The filler 60 is injected into the inner circumferential side of the cover portion 52 through a through hole 58 provided in the lid portion 54. The through hole 58 is a hole passing through the cover portion 52 from the outer circumferential side to the inner circumferential side. The through hole 58 passes through the cover portion 54 along the diameter direction of the lid portion 52, for example. The through hole 58 is an elongated hole that is elongated in the length direction of the wire harness body 11, for example. The through hole 58 is provided at a position that corresponds to the insertion opening 40X of the first path regulating member 40. In other words, the through hole 58 faces the insertion opening 40X in the diameter direction of the cover portion 52.

The filler 60 is made of a resin material. Examples of the resin material used for the filler 60 include ethylene copolymers such as EEA (ethylene ethyl acrylate copolymer) and EVA (ethylene vinyl acetate copolymer), and silicone materials such as a single-liquid type of liquid silicone rubber. For example, if the filler 60 is an ethylene-based copolymer, it is possible to inject the filler 60 through the through hole 58 using a glue gun. When injecting the filler 60, the melted filler 60 is first injected through the through hole 58 into the space circumferentially inward of the cover portion 52. The filler 60 flows into the space between the exterior member 30 and the cover portion 52 inward of the insertion opening 40X of the first path regulating member 40. Note that the viscosity of the filler 60 and the injection pressure are set such that the filler 60 does not spread entirely around the spaces corresponding to the small diameter portions 32 of the exterior member 30. As a result, the space between the exterior member 30 and the cover portion 52 inward of the insertion opening 40X is appropriately filled with the filler 60.

After being injected into the space between the exterior member 30 and the cover portion 52, the filler 60 is allowed to solidify. In the solidified state, the filler 60 has a first section 61 located in the space between the exterior member 30 and the cover portion 52 inward of the insertion opening 40X. The first section 61 adheres to the inner circumferential surface of the cover portion 52, the outer circumferential surface of the exterior member 30, and the first end portion 41 and the second end portion 42 of the first path regulating member 40. The wire harness body 11, which includes the exterior member 30 and the first path regulating member 40, is pressed against the inner circumferential surface of the cover portion 52 by the pressure of the first section 61 of the filler 60. Note that the filler 60 preferably has an appropriate extent of elasticity in the solidified state.

Also, in the solidified state, the filler 60 has a second section 62 that is formed in the through hole 58. The second section 62 adheres to the inner circumferential surface of the through hole 58. The second section 62 closes the through hole 58, for example.

As shown in FIG. 2, the wire harness 10 includes a first slide regulating member 71 that regulates sliding movement of the first path regulating member 40 in the length direction of the exterior member 30, for example. The wire harness 10 also includes a second slide regulating member 72 that regulates sliding movement of the second path regulating member 50 in the length direction of the exterior member 30, for example. The first slide regulating member 71 and the second slide regulating member 72 can be a binding band made of resin or metal, a crimping ring, adhesive tape, or the like. The first slide regulating member 71 and the second slide regulating member 72 of the present embodiment are pieces of adhesive tape. The first slide regulating member 71 is wrapped around the exterior member 30 and the end portion of the first path regulating member 40 that is not coupled to the second path regulating member 50. The second slide regulating member 72 is wrapped around the exterior member 30 and the end portion of the second path regulating member 50 that is not coupled to the first path regulating member 40.

The following describes effects of the present embodiment.

(1) The wire harness 10 includes the filler 60 that is introduced into the space between the wire harness body 11 and the cover portion 52 through the through hole 58. According to this configuration, the portion of the wire harness body 11 that passes through the cover portion 52 is pressed against the cover portion 52 by the filler 60. This makes it possible to suppress rattling between the cover portion 52 and the wire harness body 11. Note that in the above embodiment, the pressure of the filler 60 pushes the receiving portion 53 and the lid portion 54 so as to spread away from each other. This therefore suppresses rattling between the first coupling portions 55 of the receiving portion 53 and the grooves 57 of the lid portion 54.

(2) The first section 61 of the filler 60 is formed in the insertion opening 40X. The first section 61 is interposed between the outer circumferential surface of the exterior member 30 and the inner circumferential surface of the cover portion 52. According to this configuration, the exterior member 30 and the first path regulating member 40 can be pressed against the cover portion 52 by the filler 60 introduced into the space between the exterior member 30 and the cover portion 52. Also, due to the filler 60 being provided in the insertion opening 40X of the first path regulating member 40, rotation of the first path regulating member 40 in the circumferential direction can be suppressed by the filler 60. Moreover, due to the filler 60 being formed in the insertion opening 40X of the first path regulating member 40, the cover portion 52 can have a smaller size in the diameter direction than in the case of a configuration in which the filler 60 is provided so as to be in contact with the outer circumferential surface of the first path regulating member 40.

(3) The through hole 58 faces the insertion opening 40X in the diameter direction of the cover portion 52. According to this configuration, the filler 60 can be favorably introduced into the insertion opening 40X.

(4) The second section 62, which is a portion of the filler 60, is formed in the through hole 58. According this configuration, the through hole 58 can be closed by the filler 60.

(5) The second path regulating member 50 includes the body portion 51 that regulates the path of the exterior member 30, and the receiving portion 53 provided at a lengthwise end of the body portion 51 of the wire harness body 11. Also, the second path regulating member 50 includes the lid portion 54 that, together with the receiving portion 53, covers the entire circumferential range of the first path regulating member 40. The receiving portion 53 and the lid portion 54 constitute the cover portion 52. According to this configuration, it is possible to configure the cover portion 52 that, with use of the receiving portion 53 and the lid portion 54, covers the outer circumferential surface of the first path regulating member 40.

(6) The through hole 58 is provided in the lid portion 54. According to this configuration, the filler 60 can be introduced through the through hole 58 provided in the lid portion 54.

(7) The filler 60 is made of a resin material. According to this configuration, the wire harness body 11 can be favorably pressed against the cover portion 52 by the filler 60 made of a resin material.

(8) The attachment member (attachment) for attachment to the first path regulating member 40 is the second path regulating member 50 that is attached to the outer circumferential surface of the exterior member 30 and regulates the path of the exterior member 30. Also, the cover portion 52 is provided at a lengthwise end portion of the second path regulating member 50, and covers the outer circumferential surface of a lengthwise end portion of the first path regulating member 40. For this reason, the first path regulating member 40 and the second path regulating member 50 are coupled in the length direction. Accordingly, the path of the exterior member 30 is regulated with continuity by the first path regulating member 40 and the second path regulating member 50.

(9) The first path regulating member 40 regulates the path of the straight portion 11A, which is a straight portion in the path of the wire harness body 11. The second path regulating member 50 regulates the path of the bent portion 11B, which is a portion that bends along the path of the wire harness body 11. According to this configuration, deviation of the path of the straight portion 11A and the path of the bent portion 11B of the wire harness body 11 from the respective desired paths is suppressed with continuity.

The present embodiment can be implemented with modifications such as the following. The present embodiment and the following modified examples can be implemented in combination with each other as long as no technical contradiction arises.

In the cover portion 52 of the above-described embodiment, the through hole 58 for introduction of the filler 60 is provided in the lid portion 54, but the present disclosure is not particularly limited to this.

Figure 5:
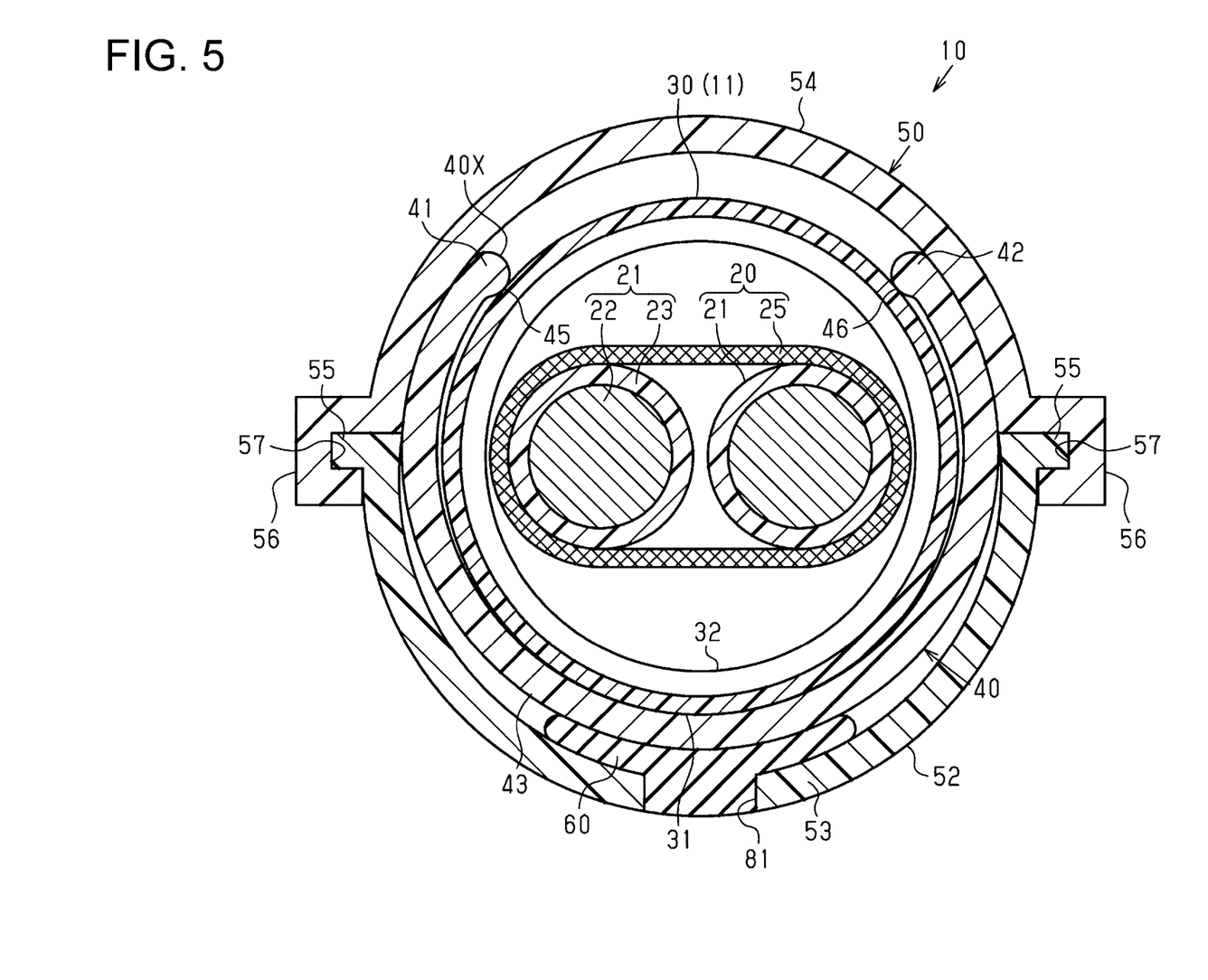
FIG. 5 is a schematic transverse cross-sectional view showing the wire harness according to a modified example.

For example, as shown in FIG. 5, a through hole 81 for introduction of the filler 60 may be provided in the receiving portion 53 of the cover portion 52. As shown in this figure, the through hole 81 is a hole that passes through the cover portion 52 from the outer circumferential side to the inner circumferential side. The through hole 81 passes through the receiving portion 53 along the diameter direction of the cover portion 52, for example. The through hole 81 is provided at a position corresponding to the outer circumferential surface of the connecting portion 43 of the first path regulating member 40. In other words, the through hole 81 faces the outer circumferential surface of the connecting portion 43 in the diameter direction of the cover portion 52. The filler 60 introduced through the through hole 81 is interposed between the outer circumferential surface of the connecting portion 43 and the inner circumferential surface of the receiving portion 53. Even with this configuration, the first path regulating member 40 can be pressed against the cover portion 52 by the filler 60 introduced into the space between the connecting portion 43 of the first path regulating member 40 and the cover portion 52.

Although the cover portion 52 has a configuration including the receiving portion 53 and the lid portion 54 in the above-described embodiment, the present disclosure is not limited to this, and the cover portion 52 may be changed to a configuration having a tubular shape and not capable of disassembly or deformation.

Also, although the lid portion 54 in the above embodiment is a member separate from the receiving portion 53, the present disclosure is not particularly limited to this, and the lid portion 54 may be integrated with the receiving portion 53.

Figure 6:
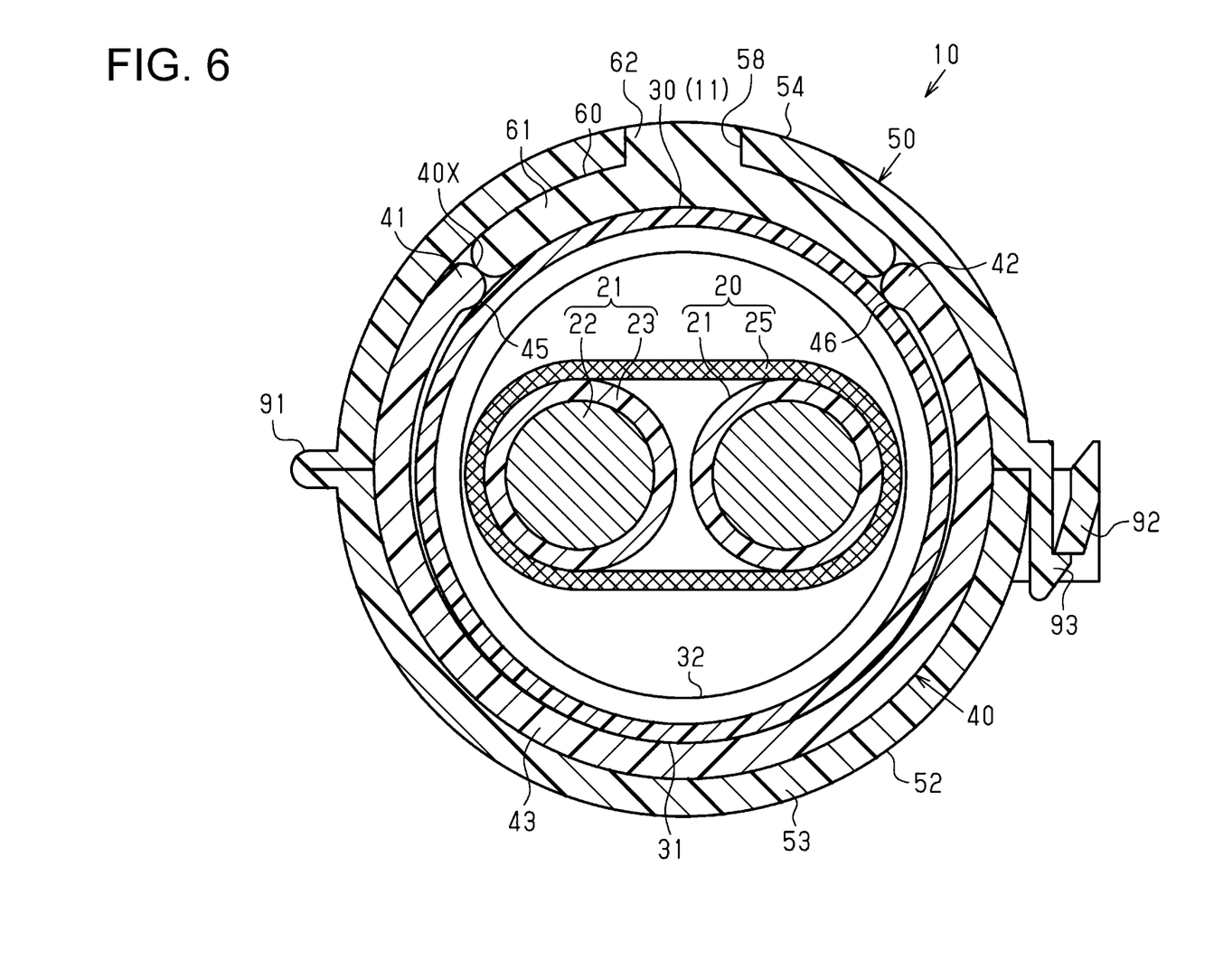
FIG. 6 is a schematic transverse cross-sectional view showing the wire harness according to another modified example.

For example, in the configuration shown in FIG. 6, the lid portion 54 is integrated with the receiving portion 53 via a thin hinge portion 91. In other words, the receiving portion 53 and the lid portion 54 are connected by the hinge portion 91. The hinge portion 91 connects one circumferential end of the receiving portion 53 and one circumferential end of the lid portion 54. A lock portion 92 is provided at the other circumferential end of the receiving portion 53. A claw portion 93 is provided at the other circumferential end of the lid portion 54.

The lid portion 54 can pivot around the hinge portion 91 between an open position and a closed position, which is shown in FIG. 6. The claw portion 93 is hooked on the lock portion 92 when the lid portion 54 is at the closed position. As a result, the lid portion 54 is held at the closed position. In this way, the receiving portion 53 and the lid portion 54 are coupled to each other. In the state in which the receiving portion 53 and the lid portion 54 are coupled, the cover portion 52 has an annular shape that surrounds the outer circumferences of the end portions of both the exterior member 30 and the first path regulating member 40. Even when the cover portion 52 has the configuration shown in FIG. 6, rattling between the cover portion 52 and the wire harness body 11 can be suppressed by pressure applied by the filler 60.

In the cover portion 52 of the above-described embodiment, the protruding-receding relationship between the first coupling portions 55 and the second coupling portions 56 may be reversed. In other words, the second coupling portions 56 may be inserted into grooves provided in the first coupling portions 55.

The shape of the through hole 58 when viewed in the penetrating direction is not limited to the above-described embodiment and may be changed to a circular shape or a polygonal shape, for example.

The constituent material of the filler 60 is not limited to the above embodiment and can be changed as appropriate as long as it is a material that has appropriate elasticity between the wire harness body 11 and the cover portion 52.

A plurality of through holes 58 and fillers 60 may be provided along the circumferential direction in the cover portion 52 of the above-described embodiment. For example, a through hole 58 may be additionally provided in the receiving portion 53, and the filler 60 may be introduced through the through holes 58 of both the lid portion 54 and the receiving portion 53.

Although the second path regulating member 50 of the above embodiment is formed so as to regulate the path of the bent portion 11B of the wire harness body 11, the present disclosure is not limited to this. For example, the second path regulating member 50 may be changed to a shape that regulates the path of the straight portion 11A of the wire harness body 11. In this case, the second path regulating member 50 is changed from a bent shape to a shape that extends in a straight line along the body portion 51, for example.

Although the attachment member that is to be attached to the first path regulating member 40 is the second path regulating member 50 in the above-described embodiment, the present disclosure is not limited to this. For example, the attachment member may be a vehicle attachment member for attaching the first path regulating member 40 to the vehicle V.

The structure of the first path regulating member 40 in the above embodiment can be changed as appropriate. For example, there are no particular limitations on the structure of the first path regulating member 40 as long as it has the insertion opening 40X and can be attached to the outer circumferential surface of the exterior member 30.

The protruding portion 45 in the above-described embodiment may be provided at a position further away from the insertion opening 40X than the leading end of the first end portion 41 in the circumferential direction of the first path regulating member 40.

The protruding portion 46 of the above-described embodiment may be provided at a position further away from the insertion opening 40X than the leading end of the second end portion 42 in the circumferential direction of the first path regulating member 40.

The protruding portions 45 and 46 of the above embodiment may be provided in portions along the length direction of the first path regulating member 40.

At least either the protruding portion 45 or the protruding portion 46 of the above embodiment may be omitted.

The shape of the connecting portion 43 of the first path regulating member 40 of the above-described embodiment is not limited to an arc shape, and can be changed to an elliptical arc shape or a U-like shape, for example.

Although the first path regulating member 40 and the second path regulating member 50 are more rigid than the exterior member 30 in the above-described embodiment, the present disclosure is not limited to this, and the hardness of the path regulating members may be less than or equal to that of the exterior member 30. In other words, it is sufficient that the first path regulating member 40 and the second path regulating member 50 have an effect of making it more difficult for the wire harness body 11 to bend than in the case where the first path regulating member 40 and the second path regulating member 50 are not attached to the wire harness body 11.

The exterior member 30 in the above-described embodiment may be a resin corrugated tube whose outer surface is provided with a metal layer containing a metal material, for example.

The exterior member 30 of the above embodiment is not limited to being a corrugated tube, and may be an exterior member that does not have the large-diameter portions 31 and the small-diameter portions 32, for example.

The exterior member 30 in the above-described embodiment may have a slit that extends in the length direction of the exterior member 30.

Although the electric wires 21 in the above-described embodiment are high-voltage electric wires, the present disclosure is not limited to such a configuration, and the electric wires 21 may be low-voltage electric wires, for example.

In the electric wire member 20 in the above-described embodiment, the braided member 25 serves as an electromagnetic shield member, but the present disclosure is not limited to such a configuration. For example, the electromagnetic shield member of the electric wire member 20 may be a metal foil.

The braided member 25 of the electric wire member 20 in the above-described embodiment may be omitted.

Although two electric wires 21 are included in the electric wire member 20 in the above-described embodiment, the present disclosure is not limited to such a configuration. There may be one electric wire 21, or three or more.

The positional relationship between the inverter M1 and the high-voltage battery M2 in the vehicle V is not limited to that in the above-described embodiment, and may be changed as appropriate depending on the vehicle configuration.

Although the inverter M1 and the high-voltage battery M2 are the in-vehicle devices to which the wire harness 10 is electrically connected in the above-described embodiment, the present disclosure is not limited to such a configuration. There are no particular limitations on the in-vehicle devices to which the wire harness 10 is to be electrically connected, as long as they are electric devices mounted in the vehicle V.

The embodiments and modified examples disclosed herein are illustrative in all respects, and the present disclosure is not intended to be limited to such illustrative examples. In other words, the scope of the present disclosure is indicated by the claims, and is intended to include all changes within the meaning and range of equivalents to the claims.

What is claimed is:

1. A wire harness comprising:
   a wire harness body including an electric wire, an exterior tube that covers an outer circumferential surface of the electric wire, and a first path regulator configured to be attached to an outer circumferential surface of the exterior tube and regulate a path of the exterior tube; and
   an attachment configured to be attached to an outer circumferential surface of the first path regulator in a lengthwise portion of the first path regulator, wherein:
   the first path regulator has an insertion opening that is open in a direction orthogonal to a length direction of the first path regulator, and that extends over an entire length of the first path regulator,
   the attachment includes a cover configured to cover the outer circumferential surface of the first path regulator,
   the cover has a through hole that extends through the cover from an outer circumferential side to an inner circumferential side,
   the wire harness further comprises a filler introduced through the through hole to a space between the wire harness body and the cover,
   the through hole faces the outer circumferential surface of the first path regulator, and
   the filler is interposed between the outer circumferential surface of the first path regulator and an inner circumferential surface of the cover.

2. The wire harness according to claim 1, wherein:
   another filler is provided in the insertion opening, and
   the another filler is interposed between the outer circumferential surface of the exterior tube and an inner circumferential surface of the cover.

3. The wire harness according to claim 2, wherein another through hole of another attachment faces the insertion opening.

4. The wire harness according to claim 1, wherein a portion of the filler is provided inside the through hole.

5. The wire harness according to claim 1, wherein:
   the attachment includes:
   a body configured to regulate the path of the exterior tube,
   a receiver provided at an end of the body in a length direction of the wire harness body, and
   a lid configured to cover, together with the receiver, an entire circumferential range of the first path regulator, and
   the receiver and the lid form the cover.

6. The wire harness according to claim 5, wherein the through hole is provided in the receiver.

7. The wire harness according to claim 1, wherein the filler is made of a resin material.

8. The wire harness according to claim 1, wherein:
   the attachment is a second path regulator that is configured to be attached to the outer circumferential surface of the exterior tube and regulate the path of the exterior tube, and
   the cover is provided at a lengthwise end of the second path regulator, and covers an outer circumferential surface of a lengthwise end of the first path regulator.

9. The wire harness according to claim 8, wherein:
   a lengthwise direction of the first path regulator extends in a straight line along a path of the wire harness body such that the first path regulator regulates a path of a straight portion of the wire harness body, and
   a lengthwise direction of the second path regulator is bent along the path of the wire harness body such that the second path regulator regulates a path of a bent portion of the wire harness body.

* * * * *